United States Patent [19]

Kojima et al.

[11] Patent Number: 4,656,094
[45] Date of Patent: Apr. 7, 1987

[54] NOVEL MULTI-LAYER ARTICLES

[75] Inventors: Shinji Kojima, Yokohama; Hirokazu Suzuki, Kawasaki; Yuichi Orikasa, Tokyo, all of Japan

[73] Assignee: Nippon Petrochemicals Co., Ltd., Tokyo, Japan

[21] Appl. No.: 754,520

[22] Filed: Jul. 12, 1985

[30] Foreign Application Priority Data

Jul. 16, 1984 [JP] Japan ............................... 59-145975

[51] Int. Cl.$^4$ ..................... B32B 27/36; B65D 65/40
[52] U.S. Cl. .................................. 428/412; 428/414; 428/417; 428/418; 428/421; 428/476.9; 428/441; 428/461; 428/516; 428/473.5; 428/520; 428/518; 428/519; 428/328; 428/329; 428/331; 428/261; 264/176.1; 426/127; 206/524.1
[58] Field of Search .............. 428/412, 441, 414, 461, 428/417, 418, 483, 421, 516–520, 513, 473.5, 476.9

[56] References Cited

U.S. PATENT DOCUMENTS 4,500,606  2/1985  Rabito et al. ..................... 428/483

FOREIGN PATENT DOCUMENTS 0053071  5/1981  Japan ................................. 428/483

*Primary Examiner*—P. C. Ives
*Attorney, Agent, or Firm*—Ladas & Parry

[57] ABSTRACT

Novel multi-layer laminate articles of improved adhesion strength comprising at least two layers including a polyester resin layer and a layer of an epoxy group-containing olefin polymer or an olefin polymer composition comprising the epoxy group-containing polymer, are described. The epoxy group-containing olefin polymer is a copolymer of an olefin and an unsaturated glycidyl group-containing monomer or a copolymer of an olefin, an unsaturated glycidyl group-containing monomer and an ethylenically unsaturated monomer.

8 Claims, No Drawings

NOVEL MULTI-LAYER ARTICLES

BACKGROUND OF THE INVENTION

1. Field of the Invention

This invention relates to multi-layer articles made of layers of polyester resins and other kinds of materials in which the inter-layer bond strength is improved. More particularly, the invention relates to multi-layer laminate articles which comprise at least two layers including a polyester resin layer and a layer of an epoxy group-containing olefin polymer or an olefin polymer composition comprising the epoxy group-containing olefin polymer. The multi-layer articles may consist of three or more layers including a polyester resin layer and a layer of the other kind of material between which the layer of the epoxy group-containing olefin polymer is interposed. These articles have low permeability to gases such as oxygen, carbon dioxide and flavors and can be favorably used as packaging materials such as food wrap films and food packaging containers.

2. Description of the Prior Art

Since polyester resins have good characteristics such as high transparency, good heat resistance and low gas permeability, they are laminated with other kinds of materials such as polyolefins and are widely used as packaging materials for foods. However, a bond between a polyester resin and other kind of material is poor, so that the resultant laminate is very readily delaminated.

In order to improve the interlaminar bond strength of the laminates, there have been used several resins including ethylene-vinyl acetate copolymers, inonomer resins, or resins obtained by modifying polyolefins with maleic anhydride (see, for example, Japanese Laid-open Patent Applications Nos. 51-92880, 52-32080, 54-82, 54-87753 and 54-160481). Although these resins have good compatibility with polyolefin resins and polyamide resins and can be bonded therewith with high interlaminar bond strength, their adhesion to polyester resins is low.

OBJECTS OF THE INVENTION

It is an object of the invention to provide multi-layer laminate articles which comprise at least a polyester resin layer and a layer of a special type of resin material, described later but have high interlaminar bond strength and good adhesion to other types of material.

It is another object of the invention to provide multi-layer laminate articles which have good heat sealability.

It is a further object of the invention to provide multi-layer laminate articles which are suitable as food wrap films, bottles for various foods, medical films or bottles and gasoline tanks.

The above objects can be achieved, according to the invention, by a novel multi-layer laminate article which comprises at least two layers including a polyester resin layer and a layer of an epoxy group-containing olefin polymer or a polymer composition comprising the epoxy group-containing polymer, the epoxy group-containing olefin polymer being a copolymer of an olefin and an unsaturated glycidyl group-containing monomer or a copolymer of an olefin, an unsaturated glycidyl group-containing monomer and an ethylenically unsaturated monomer.

DETAILED DESCRIPTION AND EMBODIMENTS OF THE INVENTION

The polyester resins used in the present invention are those resins which are obtained by condensation reaction betwen saturated dibasic acids and glycols. Examples of the polyester resins include polyethylene terephthalate obtained from ethylene glycol and terephthalic acid, polybutylene terephthalate obtained from 1,4-butanediol and terephthalic acid, polyethylene terephthalate copolymers or polybutylene terephthalate copolymers using, as comonomers, saturated dibasic acids such as phthalic acid, isophthalic acid, sebacic acid, adipic acid, azelaic acid, glutaric acid, succinic acid, oxalic acid and the like, polyethylene terephthalate copolymers or polybutylene terephthalate copolymers using, as diol comonomers, 1,4-cyclohexanedimethanol, diethylene glycol, propylene glycol and the like, and blends thereof. Specific examples of these polyethylene terephthalate resins include polyethylene terephthalate (PET), polyethylene terephthalate/isophthalate (PET/I), polyethylene terephthalate/sebacate (PET/S), polyethylene terephthalate/adipate (PET/A), and the like. Specific examples of the polybutylene terephthalate resins include polybutylene terephthalate (PBT), polybutylene terephthalate/isophthalate (PBT/I), polybutylene terephthalate/sebacate (PBT/S), polybutylene terephthalate/adipate (PBT/A), polybutylene/ethylene terephthalate, polybutylene/ethylene terephthalate/isophthalate, and the like. Also usable in the practice of the invention are polyester resins copolymerized or modified with other third components in order to improve the adhesiveness. The polyester resins may be stretched either monoaxially or biaxially.

The epoxy group-containing olefin polymers of the invention are copolymer of olefins and unsaturated glycidyl group-containing monomers, and terpolymers or multipolymers of olefins, unsaturated glycidyl group-containing monomers and ethylenically unsaturated monomers, which are preferably prepared according to high pressure radical polymerization. Preferable olefins include ethylene. Preferable copolymers consist essentially of 50–99.95 wt% of ethylene, 0.05–50 wt% of a glycidyl group-containing monomer, and 0–49.95 wt% of an ethylenically unsaturated monomer.

Examples of the unsaturated glycidyl group-containing monomers include glycidyl esters such as glycidyl acrylate, glycidyl methacrylate, monoglycidyl itaconate, monoglycidyl butenetricarboxylate, diglycidyl butenetricarboxylate, triglycidyl butenetricarboxylate, glycidyl esters of alpha-chloroallyl, maleic acid, crotonic acid, fumaric acid and the like, glycidyl ethers such as vinyl glycidyl ether, allyl glycidyl ether, 2-methylallyl glycidyl ether, glycidyloxyethyl vinyl ether, styrene-p-glycidyl ether and the like, and p-glycidylstyrene. Preferably, glycidyl methacrylate and allyl glycidyl ether are mentioned.

The ethylenically unsaturated monomers of the invention may be at least one monomer selected from olefins, vinyl esters, alpha, beta-ethylenically unsaturated carboxylic acids and derivatives thereof. Specific examples include olefins such as propylene, butene-1, hexene-1, decene-1, octene-1, styrene and the like, vinyl esters such as vinyl acetate, vinyl propionate, vinyl benzoate and the like, acrylic acid, methacrylic acid and esters thereof such as methyl, ethyl, propyl, butyl, 2-ethylhexyl, cyclohexyl, dodecyl, octadecyl acrylates or methacrylates, maleic acid, maleic anhydride, itaconic acid, fumaric acid, maleic mono and diesters, vinyl chloride, vinyl ethers such as vinyl methyl ether, vinyl ethyl ether and the like, and acrylic amides. Of these, acrylates are preferred.

The epoxy group-containing olefin polymers are prepared according to a high pressure radical polymerization process in which 50–99.95 wt% of ethylene, 0.05–50 wt% of at least one unsaturated glycidyl group-containing monomer, and 0–49.95 wt% of at least one other ethylenically unsaturated monomer are contacted simultaneously or in a stepwise manner for polymerization in a vessel or tubular reactor in the presence of 0.0001–1 wt% of a free radical catalyst, based on the total weight of the monomers, and also in the presence of a chain transfer agent and, if necessary, an aid under conditions of a polymerization pressure of 500–4000 Kg/cm$^2$, preferably 1000–3500 Kg/cm$^2$ and a reaction temperature of 50°–400° C., preferably 100°–350° C.

The free radical catalysts may be ordinary initiators such as peroxides, hydroperoxides, azo compounds, amine oxide compounds, oxygen and the like.

The chain transfer agents include, for example, hydrogen, propylene, butene-1, saturated aliphatic hydrocarbons and halogenated hydrocarbons having 1–20 or more carbon atoms, e.g. methane, ethane, propane, butane, isobutane, n-hexane, n-heptane, cycloparaffins, chloroform, carbon tetrachloride, saturated aliphatic alcohols having 1–20 or more carbon atoms, e.g. methanol, ethanol, propanol, isopropanol and the like, saturated aliphatic carbonyl compounds having 1–20 or more carbon atoms, e.g. carbon dioxide, acetone, methyl ethyl ketone and the like, and aromatic compounds such as toluene, diethylbenzene, xylene and the like.

The epoxy group-containing olefin polymers may be used, as compositions, by mixing and diluting with olefin polymers which are used as base materials described hereinafter. In this case, the blend ratio is selected such that the content of the epoxy group-containing monomer is in the range of 0.05–50 wt%. If the content of the epoxy group-containing monomer is less than 0.05 wt%, the interlaminar bond strength is low with the fear that such laminates may not serve for practical purposes. On the other hand, when the concentration exceeds 50 wt%, the resulting polymer is hard to handle.

The multi-layer laminate articles of the invention fundamentally comprise at least two layers including a layer of the afore-indicated polyester resin and a layer of the epoxy group-containing olefin polymer or a composition comprising the epoxy group-containing olefin polymer. Since the epoxy group-containing olefin polymer or composition comprising the same has good adhesion to other types of materials, a further layer may be laminated on the epoxy group-containing olefin polymer layer of the two-layer structure. Thus, a multi-layer laminate, which makes the best use of the respective characteristic properties of the same and different kinds of materials, can be provided. Examples of the same and different kinds of materials used for these purposes include: polyolefins including homopolymers such as low, medium and high density polyethylene, polypropylene, polybutene-1, poly-4-methylpentene-1 and the like, copolymers of a major proportion of ethylene and other alpha-olefins such as ethylenepropylene copolymers, ethylene-butene-1 copolymers, ethylene-hexene-1 copolymers, ethylene-4-methylpentene-1 copolymers, ethylene-octene-1 copolymers and the like, copolymers of a major proportion of propylene and other alpha-olefins such as propylene-ethylene block copolymers, ethylene-vinyl acetate copolymers, ethylene-methacrylic acid copolymers, ethylene-acrylic acid copolymers, copolymers of ethylene and methyl, ethyl, propyl, isopropyl and butyl acrylates or methacrylates ethylene-maleic acid copolymers, ethylene-vinyl acetate-vinyl chloride copolymers, and mixtures thereof; other thermoplastic resins including saponified ethylene-vinyl acetate copolymers, polyamide resins, polycarbonate resins, polyvinyl chloride resins, polyvinylidene chloride, polyester resins, polyacrylonitrile resins, polystyrene resins, polyvinyl alcohol resins, ABS resins, polymethacrylates, fluorocarbon resins, polyimide resins, polyamideimide resins, polyether/ether ketone resins, polyethersulfone resins, polysulfone resins, polyphenylene oxide resins, polyphenylene sulfide resins, polyacetal resins and mixtures thereof; thermosetting resins such as phenolic resins, urea resins, melamine resins and the like; and rubbers.

Examples of rubbers include synthetic rubbers such as polybutadiene, polyisoprene, neoprene rubber, ethylene-propylene copolymers, ethylene-propylene-diene copolymers, styrene-butadiene copolymer, styrene-acrylonitrile-butadiene copolymer, butyl rubber, polyurethane rubber, chlorosulfonated polyethylene, chlorinated polyethylene, fluororubbers, Thiokol and the like, and natural rubbers.

The sheets of the synthetic resins or rubbers mixed with fillers may be also used in the present invention.

The fillers for these purposes include, for example, powdery and particulate fillers such as calcium carbonate, magnesium carbonate, calcium sulfate, calcium silicate, clay, diatomaceous earth, talc, alumina, quartz sand, glass powder, iron oxide, metal powders, antimony trioxide, graphite, silicon carbide, silicon nitride, silica, boron nitride, aluminum nitride, wood powder, carbon black and the like; plate-like or flaky fillers such as mica, glass, sericite, pyrophyllite, metal foils such as aluminum flake, graphite and the like; hollow fillers such as Shirasu balloons, metal balloons, glass balloons, pumice stone and the like; fibrous fillers such as glass fibers, carbon fibers, graphite fibers, whiskers, metal fibers, silicon carbide fibers, mineral fibers, e.g. asbestos and wollastonite, and organic fibers such as viscose, polyamide and vinylon fibers; and fiber fabric fillers such as glass fiber mats, organic fiber mats and the like.

The multi-layer article of the invention may have a third layer of one of such materials as metal foils, metal sheets, metal gauzes and punched plates of metals such as chromium, iron, nickel, zinc, tin, aluminum, copper, brass, galvanized steel and the like.

Cloths may be also used as the third layer and include non-woven or woven fabrics or nettings of fibers such as tape yarns and monofilaments obtained from the thermoplastic resins indicated before, split films obtained by finely cutting films of the thermoplastic resins, woven fabrics of synthetic fibers such as vinylon and tetron fibers or natural fibers such as cotton, silk and hemp fibers, and woven fabrics, mats and felts of fibers such as glass fibers, carbon fibers and metal fibers.

Paper sheets used as the third layer material may not be critical and include, for example, packaging papers such as kraft paper, roll paper and the like, thin papers such as glassine paper, paperboards and other machine-made papers, Japanese papers such as shoji paper, and synthetic papers such as polystyrene paper, vinylon paper and the like.

Examples of the multi-layer laminates using different types of materials include polyester resin layer (hereinafter abbreviated as PET)/epoxy group-containing olefin polymer layer (hereinafter abbreviated as EGA)/high density polyethylene layer (hereinafter abbreviated as HDPE), PET/EGA/saponified ethylene-vinyl acetate copolymer (hereinafter abbreviated as saponified EVA), PET/EGA/aluminum (hereinafter referred to as Al), PET/EGA/paper, PET/EGA/PET, PET/EGA/PET/ethylene-butene-1 copolymer (hereinafter abbreviated as LLDPE), and the like.

The method of making laminate articles is not critical and includes, for example, a blown film extrusion using multi-layer dies, flat film extrusion using T-dies, blow molding, injection molding, brush application, fluidized bed coating, powder spray coating, electrostatic coating, press molding and the like.

In the practice of the invention, various forms of materials including films, sheets, plates, bars, pipes, woven fabrics, and other processed articles may be bonded.

Moreover, various additives may be used in the range of amount not impeding the purposes of the invention. Examples of such additives include antioxidants, UV absorbers, flame retardants, copper deactivators, processability improvers, reinforcing agents, fillers, colorants, pigments, antistatic agents, antiblocking agents, foaming agents and the like.

The present invention is more particularly described by way of examples and comparative examples.

EXAMPLES 1–3

<Preparation of Epoxy Group-containing Olefin Polymers>

1.7 kg of ethylene and 30 g of glycidyl methacrylate comonomer were charged into a 3.8 liter autoclave, followed by copolymerizing in the presence of di-tertiary-butyl peroxide under conditions of a pressure of 1700 kg/cm$^2$·g and a temperature of 170° C., thereby obtaining ethylene-glycidyl methacrylate copolymer (hereinafter referred to simply as Et-GMA). Similarly, the above procedure was repeated using different amounts of the comonomer, thereby obtaining other types of Et-GMA copolymers as shown in Table 1.

The thus prepared Et-GMA copolymers were used for adhesion to PET and other materials, and the resulting laminates were subjected to measurement of interlaminar bond strength with the results shown in Table 1. The interlaminar bond strength was measured under the following conditions.

<Measuring Conditions>

PET, saponified EVA, HDPE and Al sheets, each having a thickness of 2 mm, were each placed over an Et-GMA copolymer sheet having a thickness of 1 mm, which was in term backed with a 50 μm thick Al foil for reinforcement of the copolymer layer. Each assembly was preheated for 5 minutes, and pressed together under conditions of 240° C. and 50 kg/cm$^2$×5 minutes for PET and under conditions of 180° C. and 50 kg/cm$^2$×5 minutes for the other materials. Each laminate was subsequently cooled and cut to a width of 25 mm to give a test piece.

The test pieces were subjected to 180° peeling test at a pulling rate of 50 mm/minute, and this strength was determined as the interlaminar bond strength.

EXAMPLE 4

The general procedure of Example 1 was repeated using, as the comonomers, glycidyl methacrylate and ethyl acrylate to obtain a terpolymer of ethylene-glycidyl methacrylate-ethyl acrylate (hereinafter referred to as Et-GMA-EA), followed by a bond strength test in the same manner as in Example 1. The results are shown in Table 1.

EXAMPLE 5

One hundred parts by weight of the Et-GMA copolymer of Example 3 was blended with 200 parts by weight of an ethylene-ethyl acrylate copolymer having an ethyl acrylate content of 19 wt% and a melt index of 5.3 g/10 minutes. The blend was used to the bond strength test in the same manner as in Example 1. The results are also shown in Table 1.

COMPARATIVE EXAMPLES 1–3

EEA used in Example 5, ethylene-vinyl acetate copolymer having a vinyl acetate content of 15 wt% and a melt index of 1.5 g/10 minutes (hereinafter referred simply as EVA), and maleic anhydride-modified low density polyethylene having a density of 0.92 g/ml and a melt index of 1.0 g/10 minutes (trademark; N Polymer L6100, made by Nippon Petrochemical Co., Ltd.) (hereinafter referred to as N Polymer) were used, instead of the Et-GMA copolymer of Example 1, for bonding to several other materials in the same manner as in Example 1. The results are shown in Table 1.

COMPARATIVE EXAMPLES 4–5

One hundred parts by weight of 20 mesh-pass powder of ethylene-butene-1 copolymer having a density of 0.934 g/ml and a melt index of 10 g/10 minutes and available under the trademark of NISSEKI LINIREX AJ5610, by Nippon Petrochemical Co., Ltd.) (hereinafter referred to simply as LLDPE) was impregnated with 10 parts by weight of glycidyl methacrylate (GMA) and 0.3 part by weight of benzoyl peroxide, followed by graft copolymerization in water with agitation under conditions of 85° C.×6 hours. The resulting product was separated by filtration, washed with hot water and acetone, and dried. The amount of the grafted GMA in the product was quantitatively determined by infrared spectroscopic analysis. Likewise, another graft copolymer was prepared with a different amount of the grafted GMA.

The graft copolymers were tested in the same manner as in Example 1. The results are shown in Table 1.

TABLE 1

| | Epoxy group-containing Olefin polymer | | | | Olefin polymer | | Bond Strength (kg/25 mm in width) Substrates | | | |
|---|---|---|---|---|---|---|---|---|---|---|
| Example/ Comp. Ex. | Polymer Type | Monomer Content (wt %) | MI (g/10 min.) | Amount (parts by weight) | Polymer Type | Amount (parts by weight) | PET | EVA Saponified | HDPE | Al |
| Example 1 | Et-GMA | GMA = 5.4 | 3.0 | 100 | — | — | breakage | 7.0 | breakage | 16.3 |

TABLE 1-continued

| | Properties/Evaluation | | | | | | | | | |
|---|---|---|---|---|---|---|---|---|---|---|
| | Epoxy group-containing Olefin polymer | | | | Olefin polymer | | Bond Strength (kg/25 mm in width) Substrates | | | |
| Example/ Comp. Ex. | Polymer Type | Monomer Content (wt %) | MI (g/10 min.) | Amount (parts by weight) | Polymer Type | Amount (parts by weight) | PET | EVA Saponi- fied | HDPE | Al |
| Example 2 | Et-GMA | GMA = 13.6 | 2.5 | 100 | — | — | breakage of material | 9.0 | breakage of material | breakage of material |
| Example 3 | Et-GMA | GMA = 17.2 | 8.8 | 100 | — | — | breakage of material | 11.3 | breakage of material | breakage of material |
| Example 4 | Et-GMA-EA | GMA/EA = 5.4/15 | 1.4 | 100 | — | — | breakage of material | 9.5 | breakage of material | breakage of material |
| Example 5 | Et-GMA | GMA = 17.2 | 8.8 | 100 | EEA (EA = 19) | 200 | breakage of material | 10.7 | breakage of material | breakage of material |
| Comp. Ex. 1 | — | — | — | — | EEA (EA = 19) | 100 | 0.7 | 0.8 | breakage of material | 9.7 |
| Comp. Ex. 2 | — | — | — | — | EVA (VA = 15) | 100 | 0.7 | 0.8 | breakage of material | 12.7 |
| Comp. Ex. 3 | — | — | — | — | N Polymer | 100 | 1.5 | 5.0 | breakage of material | 8.5 |
| Comp. Ex. 4 | LLDPE/GMA graft copolymer | GMA = 0.71 | 2.6 | 100 | — | — | 0 | 0 | breakage of material | 2.5 |
| Comp. Ex. 5 | LLDPE/GMA graft copolymer | GMA = 6.4 | 1.5 | 100 | — | — | 0 | 0 | breakage of material | — |

The multi-layer laminate articles of the invention which comprise at least two layers including a polyester resin layer and a layer of an epoxy group-containing olefin polymer or an olefin polymer composition comprising the epoxy group-containing olefin polymer, have high interlaminar bond strength and are readily heat-sealable with other kinds of materials. In the three- or more multi-layer laminate articles such as PET/Et-GMA/saponified EVA or polyolefin, the characteristic properties of polyester resins such as low gas permeability and high resistances to oils and heat can be fully utilized in combination with the characteristic properties of the other kinds of materials. These articles are particularly useful as food wrap films, materials for food packaging bottles for mayonnaise, soy sauce, carbonated drinks, oils and the like, films and bottles for packaging medicines, and gasoline tanks.

What is claimed is:

1. A multi-layer laminate article which comprises at least two layers including a polyester resin layer and a layer of an epoxy group-containing olefin polymer or an olefin polymer composition comprising the epoxy group-containing olefin polymer, the epoxy group-containing olefin polymer being a copolymer containing an unsaturated glycidyl group containing monomer in the main chain prepared by subjecting 50-99.95 wt% of ethylene, 0.05-50 wt.% of an unsaturated glycidyl group-containing monomer and up to 49.95% wt.% of an ethylenically unsaturated monomer to polymerization.

2. A multi-layer article according to claim 1, wherein the the unsaturated glycidyl group-containing monomer is glycidyl methacrylate or glycidyl acrylate.

3. A multi-layer article according to claim 1, wherein the ethylenically unsaturated monomer is at least one monomer selected from the group consisting of olefins, vinyl esters, alpha, beta-ethylenically unsaturated carboxylic acids and derivatives thereof.

4. A multi-layer article according to claim 3, wherein the ethylenically unsaturated monomer is a member selected from the group consisting of vinyl acetate, methacrylic acid, acrylic acid, methyl methacrylate, methyl acrylate, ethyl methacrylate, ethyl acrylate, butyl methacrylate, butyl acrylate, maleic acid and maleic anhydride.

5. A multi-layer article according to claim 1, wherein said article is a three-layer structure comprising the polyester resin layer as a first layer, the layer of the epoxy group-containing olefin polymer or the olefin polymer composition as a second layer comprising the epoxy group-containing olefin polymer, and a third layer arranged in this order.

6. A multi-layer article according to claim 5, wherein said third layer is of at least one member selected from the group consisting of thermoplastic resins, thermosetting resins, rubbers, paper, wood, cloths, metals and glass.

7. A multi-layer article according to claim 6, wherein the thermoplastic resin is at least one member selected from the group consisting of olefin resins, saponified ethylene-vinyl acetate copolymers, polyamide resins, polycarbonate resins, polyvinyl chloride resins, polyvinylidene chloride resins, polyester resins, polyacrylonitrile resins, polystyrene resins, polyvinyl alcohol resins, ABS resins, polymethyl methacrylate, fluorocarbon resins, polyimide resins, polyamide-imide resins, polyether.ether ketone resins, polyether sulfone resins, polysulfone resins, polyphenylene oxide resins, polyphenylene sulfide resins and polyacetal resins and blend thereof.

8. A multi-layer article according to claim 7, wherein said article has a three-layer structure consisting of a polyester resin layer, a layer of ethylene/glycidyl methacrylate copolymer, and a layer of a saponified ethylene-vinyl acetate resin.

* * * * *